United States Patent [19]

Crandall et al.

[11] 4,320,489
[45] Mar. 16, 1982

[54] REVERSIBLE OPTICAL STORAGE MEDIUM AND A METHOD FOR RECORDING INFORMATION THEREIN

[75] Inventors: Richard S. Crandall, Princeton; Allen Bloom, East Windsor, both of N.J.

[73] Assignee: RCA Corporation, New York, N.Y.

[21] Appl. No.: 126,706

[22] Filed: Mar. 3, 1980

[51] Int. Cl.$^3$ .................................................. G11B 7/26
[52] U.S. Cl. .................................. 369/111; 346/76 L;
346/135.1; 369/275; 369/284
[58] Field of Search ................ 179/100.1 G, 100.3 V;
358/128.5, 129; 346/76 L, 77 E, 135.1, 151;
365/113, 126; 369/100, 109, 111, 275, 283, 284

[56] References Cited

U.S. PATENT DOCUMENTS

| | | | |
|---|---|---|---|
| 3,055,006 | 9/1962 | Dreyfoos, Jr. et al. | 346/77 E |
| 3,427,628 | 2/1969 | Clunis | 358/129 X |
| 3,475,760 | 10/1969 | Carlson | 358/129 |
| 3,732,363 | 5/1973 | Glenn, Jr. | 346/77 E |
| 3,965,461 | 6/1976 | Wreede et al. | 345/151 |
| 4,097,895 | 6/1978 | Spong | 179/100.3 V |
| 4,139,853 | 2/1979 | Ghekiere et al. | 346/76 L |
| 4,219,826 | 8/1980 | Bloom et al. | 346/135.1 |

OTHER PUBLICATIONS

Credelle et al., "Thermoplastic Media for Holographic Recording", RCA Review, vol. 33, Mar. 1972, pp. 207-226.

Gundlach et al., "A Cyclic Xerographic Method Based on Frost Deformation", Photographic Science and Eng., vol. 7, #1, Jan.-Feb. 1963, pp. 14-19.

*Primary Examiner*—Bernard Konick
*Assistant Examiner*—Donald McElheny, Jr.
*Attorney, Agent, or Firm*—Birgit E. Morris; William J. Burke

[57] ABSTRACT

A reversible optical recording medium is comprised of an electrically conductive layer overlain by a thermoplastic layer containing a light absorptive compound selected from the group consisting of metal complexes of substituted ethylene dithiols having the structure

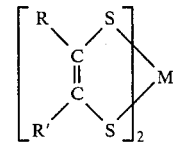

where M is Pt, Pd, or Ni and R and R' are independently alkyl, phenyl or substituted phenyl groups. Information is recorded by sequentially charging the recording medium and then heating it above its softening temperature by absorption of the recording light beam in the thermoplastic layer.

11 Claims, 2 Drawing Figures

REVERSIBLE OPTICAL STORAGE MEDIUM AND A METHOD FOR RECORDING INFORMATION THEREIN

The invention is a reversible optical recording medium or information record and a method of storing information therein where an optically sensitive thermoplastic is used as the deformable storage material.

BACKGROUND OF THE INVENTION

Spong, U.S. Pat. No. 4,097,895 issued June 27, 1978 and incorporated herein by reference, has disclosed an optical recording system and an ablative optical recording medium for use therein. The recording medium comprises a light reflective material which is coated with a layer of a light absorptive organic material. A focussed, modulated light beam, such as a light beam from an argon ion laser, when directed at the recording medium vaporizes or ablates the light absorptive layer leaving an opening in this layer and exposing the light reflective material. The reflectivity in the area of the opening in the light absorptive layer is essentially that of the light reflective material and is much greater than that of the surrounding unexposed region. During readout this difference in reflectivity is detected optically and converted into an electrical signal representative of the recorded information.

Credelle et al, RCA Review, 33, 206 (1972), have disclosed the utility of thermoplastic materials for holographic recording. The recording medium comprises a substrate, overlaid sequentially by an electrically conductive coating, a photoconductor and a thermoplastic material. Information is recorded in this medium using the steps of: (1) electrically charging the free surface of the thermoplastic material thus inducing a voltage between the free surface and the conducting layer; (2) exposing the light absorbing photoconductor to a recording light beam thus discharging the voltage across the photoconductor and leaving the surface charge on the thermoplastic unchanged; (3) recharging the free surface thereby producing an increase in surface charge in the exposed areas; (4) heating the thermoplastic material to a softening temperature whereby it deforms in response to the nonuniform electrical field until these forces are balanced by surface tension forces. Alternatively, the electrical charging and exposure are carried out simultaneously or the charging and exposure can be carried out during the heating and/or cooling of the thermoplastic thus reducing the time required for recording. Information so recorded can be erased by heating the uncharged thermoplastic material above its softening temperature.

Gundlach et al, Photographic Science and Engineering, 7, 14 (1963), have disclosed that if the thermoplastic material is heated to its softening temperature while uniformly charged a random deformation of the thermoplastic material in the charged region, known as frost, occurs. This random deformation has a dominant spatial wavelength about twice the thermoplastic layer thickness and is reversible.

Ghekiere, U.S. Pat. No. 4,139,853, issued Feb. 13, 1979, discloses a recording medium consisting of a thermoplastic layer having a light absorbing organic dye dissolved therein to impart light sensitivity to the medium. This patent discloses that, upon exposure to light, minute light scattering centers are formed in the thermoplastic layer. The information recorded therein by this process is not reversible, i.e. it cannot be erased.

Spong's optical recording medium and others similar to it are not reversible since once the light absorbing layer is ablated this layer cannot be returned to its original state without remanufacture of the optical recording medium. A reversible optical storage medium which can be read out immediately after recording is desirable since information stored on the medium could then be updated without rerecording all the information stored therein or alternatively the optical recording medium can be reused after erasure of all the information stored therein.

SUMMARY OF THE INVENTION

A reversible optical recording medium comprises an electrically conductive layer and a layer of a light absorbing thermoplastic material overlying the electrically conductive layer. The thermoplastic material contains a light absorptive compound which does not affect its deformation properties and which is selected from the group consisting of metal complexes of substituted ethylene dithiols having the structure

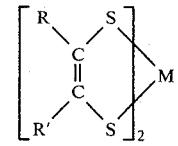

where M is Pt, Pd or Ni and R and R' are independently alkyl, phenyl or substituted phenyl groups.

Information is recorded in this medium by applying a uniform electrical charge to the free surface of the thermoplastic material and then selectively exposing the thermoplastic material to a modulated light beam. The energy absorbed from the light beam is sufficient to heat the thermoplastic material to its softening temperature whereby a frost pattern is formed in the region of thermoplastic material heated by the light beam. Recorded information is erased by heating the uncharged thermoplastic material, either locally or in its entirety, above its softening temperature.

DETAILED DESCRIPTION OF THE INVENTION

Figure 1:
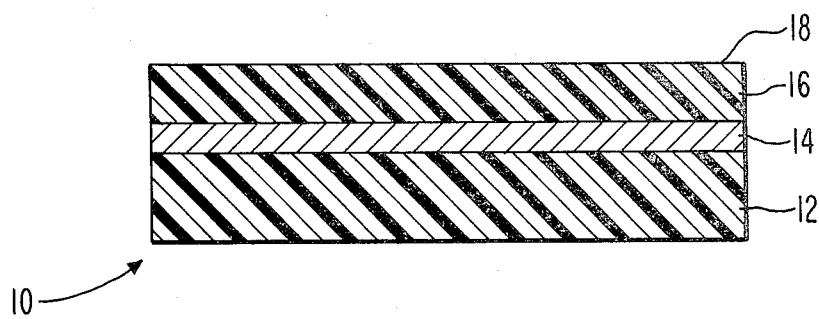
FIG. 1 is a schematic illustration of a cross-sectional view of the reversible optical recording medium of the invention.

FIG. 1 is a schematic illustration of a cross-sectional view of a reversible optical recording medium 10 which comprises a substrate 12; an electrically conductive layer 14 overlying said substrate; and a layer of a thermoplastic material 16 overlying said conductive layer and having a major free surface 18.

Figure 2:
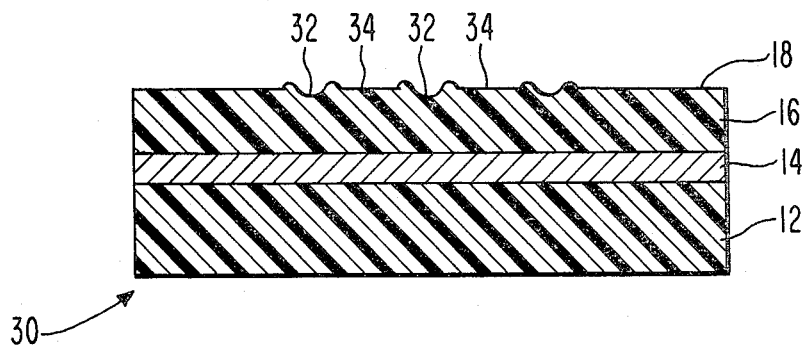
FIG. 2 is a schematic illustration of a cross-sectional view of the reversible optical recording medium of the invention with information recorded therein.

FIG. 2 is a schematic illustration of a cross-sectional view of an information record 30. The identification of the elements of the information record 30 correspond to those of the optical recording medium 10 in FIG. 1. The information is recorded in the thermoplastic material layer 16 in the form of deformations 32 in the major surface 18. Typically information is encoded in the medium by varying the length of the deformations 32 and of the unexposed areas 34 of the thermoplastic material 16 between the deformations 32 along the direction of the track. The lengths of the deformations 32 are determined by the length of the time that the recording medium is exposed to the recording light beam and the speed at which the recording medium is moving through the focal plane of the recording light beam.

Information is recorded in the optical recording medium 10 of the invention by depositing an effective, uniform amount of electrical charge on the free surface 18 of the recording medium 10 and then heating the thermoplastic material in the local region in which information is to be recorded to the softening temperature by means of energy absorbed in the thermoplastic material from the recording light beam.

Information so recorded can be erased by heating the uncharged thermoplastic material, either locally or in toto, to its softening temperature. Local erasure can be done using the recording light beam as the heat source. Erasure of the entire recording medium can be done by dissipating sufficient electrical energy in the electrically conductive layer 14 or by an external heat source such as an oven to raise the temperature.

Alternatively, information may be recorded in the optical recording medium of the invention by erasing the frost pattern in a local region. In this method, the recording medium is first uniformly charged and heated to its softening temperature resulting in a frosting of the entire charged area. Information is then recorded in this medium by exposing the uncharged frosted recording medium to a recording light beam of sufficient intensity to locally raise the recording medium to its softening temperature thereby locally erasing the frost pattern. Information is encoded in the medium by varying the length of the exposed, erased areas and the unperturbed frosted areas along the direction of the track.

Information so recorded may be read out in transmission or reflection. In transmission erasure of the frost will reduce the scattering of the readout light beam and thereby increase the transmittance of the optical recording medium. In reflection erasure of the frost will change the reflectance of the optical recording medium.

The characteristic property of the frost pattern is that its dominant spatial wavelength is about twice the thickness of the thermoplastic light absorptive layer. The surface area of this layer which can deform depends upon the recording light beam diameter as a measure of the extent of the area raised to the softening temperature. Thus, the thickness of the thermoplastic layer is preferably equal to or less than about one half of the light beam diameter.

The depth of the deformation and the speed at which it is formed both increase with increasing electric field across the light absorptive layer. Typically the electric field is about $3 \times 10^6$ volts/cm. corresponding to a surface charge density of about $10^{-6}$ coulombs/cm$^2$. This surface charge may be deposited using a fine wire corona discharge. The electric field is limited to fields less than that sufficient to cause electrical breakdown.

The substrate 12 may be comprised of an electrically conductive material thus combining the functions of the substrate 12 and the electrically conductive layer 14 or it may be comprised of a plastic material such as polyvinylchloride. The thickness of the substrate 12 need only be sufficient to support the remainder of the structure.

Any roughness of the surface of the substrate 12, which the electrically conductive layer 14 overlies, on the scale of the focussed light beam diameter will produce noise in the signal channel during readout. The interposition of a non-conformal coating of a plastic material such as an epoxy resin on the surface of the substrate 12 between the substrate 12 and the electrically conductive layer 14 will produce a microscopically smooth surface and reduce this noise source.

The electrically conductive layer 14 may be comprised of any material which forms a smooth, electrically continuous layer sufficient to form a ground plane. The conductivity may be chosen such that, when an electrical current is passed therethrough, sufficient energy is dissipated in the layer to heat the thermoplastic material above its softening temperature. Preferably the resistivity of the layer 14 is between about 10 ohms per square and about 300 ohms per square. Indium tin oxide having a resistivity of between about 20 ohms per square and 100 ohms per square is suitable. The electrically conductive layer 14 may be transmissive or reflective to the recording and read out light beams and may be a layer which reflects a substantial portion, greater than 30%, of the light incident thereon. A layer of aluminum between about 30 nanometers and about 60 nanometers thick is suitable.

The light sensitive thermoplastic layer 16 should form a smooth, amorphous, coherent, continuous, optically clear layer when deposited on the electrically conductive layer 14. Preferably, the thermoplastic material has a softening temperature about 125° C. or less. Suitable materials for the thermoplastic layer are Staybelite ester 10, which is a glycerol ester of hydrogenated rosin, manufactured by Hercules, Inc., and related compounds.

If the conductive layer is comprised of a substantially reflecting material such as aluminum, then the sensitivity of the recording medium can be enhanced by adjusting the thickness of the thermoplastic layer containing a light absorptive compound such that the reflectivity of the recording medium is reduced. Preferably, the thickness is adjusted so that an anti-reflection condition is obtained.

In the method of the invention light is absorbed in the thermoplastic layer to raise the temperature of the thermoplastic material above its softening point. Since the thermoplastic material is typically light transparent or weakly absorbing, the addition of a light absorptive compound to the thermoplastic material may be required. The addition of this light absorptive compound cannot change the required properties of the thermoplastic layer stated above nor affect its frost properties. The light absorptive compound must also be soluble in useable dip-coating or spin-coating solvents in which the thermoplastic material is also soluble. We have found that substituted ethylene dithiols having the structure

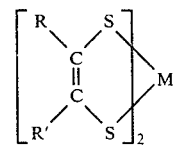

where M is Pt, Pd or Ni, and R and R' are independently alkyl, phenyl or substituted phenyl groups are suitable light absorptive compounds. These organic materials are soluble in common organic solvents such as methyl ethyl ketone or toluene as well as in thermoplastics such as Staybelite ester 10 and do not affect the frost properties of the ester.

A particular material found useful for this application is the ethylene dithiol where M=Pt and R and R+ are both phenyl groups. A quantity of 0.43 grams of this material and 1.3 grams of Staybelite ester 10 were dissolved in 4 ml of toluene and then spin coated at 2100 rpm onto a glass slide. The resulting film was 550 nanometers thick, absorbed 55% of the incident light at 820 nanometers and frosted at 87° C.

A second useful member of this class in the ethylene dithiol where M=Ni and R and R' are both n-propyl.

Metallophthalocyanine materials were found not to be useful in this application since they were not soluble in suitable solvents for thermoplastics, that is, solvents which evaporate fast enough for use with spin and dip coating techniques.

The material Zapon Fast Yellow R, Color Index No. 18690, also known as Solvent Yellow 21 and which is available from the BASF Corporation, Parsippany, N.J. and Staybelite ester 10 formed a suitable light absorbing layer. However, charge deposited on the layer surface leaked off rapidly during heating so that the layer could not frost. Only when the charge was continually replaced during the heating process would the layer deform.

I claim:

1. A reversible optical recording medium for use in an optical recording and readout system, operating at a specific wavelength, which comprises:
    an electrically conductive layer;
    a light absorptive layer overlying the conductive layer and comprising a frostable thermoplastic material containing an organometallic compound selected from the group consisting of metal complexes of substituted ethylene dithiols having the structure

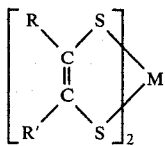

where M is Pt, Pd, or Ni and R and R' are independently alkyl, phenyl or substituted phenyl groups; and
    wherein the organometallic compound absorbs light of said wavelength and does not affect the frost properties of the thermoplastic material.

2. A reversible optical recording medium according to claim 1 wherein M is nickel and R and R' are each n-propyl groups.

3. A reversible optical recording medium according to claim 1 wherein M is platinum and R and R' are each a phenyl group.

4. A reversible optical recording medium according to claim 1 wherein the electrically conducting layer is substantially reflective of light at said wavelength and the thickness of the light absorbing layer is such that the reflectivity of the recording medium is reduced at said wavelength.

5. An optical recording medium according to claim 1 wherein the light absorptive layer has a uniform frost pattern therein.

6. A reversible information record for use in an optical readout system operating at a specific wavelength, which comprises:
    an electrically conductive layer;
    a light absorptive layer with an information track recorded therein, said absorptive layer overlying the conductive layer and comprising a frostable thermoplastic material containing an organometallic compound selected from the group consisting of metal complexes of substituted ethylene dithiols having the structure

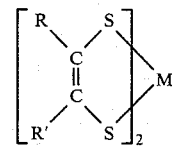

M is Pt, Pd, or Ni and R and R' are independently alkyl, phenyl or substituted phenyl groups;
    wherein the organometallic compound absorbs light of said wavelength and does not affect the frost properties of said thermoplastic material.

7. An information record according to claim 6 wherein the information track is a sequence of frosted and unfrosted regions.

8. A method for the reversible storage of information in an optical recording and readout system, operating at a specific wavelength, which comprises the steps of:
    (a) forming a conducting layer;
    (b) forming a light absorptive layer thereon comprising a frostable thermoplastic material containing an organic compound which absorbs light of said wavelength, and which does not affect the frost properties of said thermoplastic material;
    (c) applying a uniform electric charge to the light absorptive layer; and
    (d) selectively exposing the light absorptive layer to a modulated beam of light of said wavelength whereby the energy absorbed by the light absorptive layer from said beam heats the light absorptive layer to its softening temperature thereby frosting the light absorptive layer.

9. A method according to claim 8 wherein the deformation of the light absorptive layer is erased by heating the light absorptive layer in an uncharged state to its softening temperature.

10. A method for the reversible storage of information in an optical recording and readout system, operating at a specific wavelength, which comprises the steps of:
    (a) forming a conducting layer;
    (b) forming a light absorptive layer thereon comprising a frostable thermoplastic material containing an organic compound which absorbs light of said wavelength and which does not affect the frost properties of the thermoplastic material;
    (c) applying a uniform electric charge to the light absorptive layer;
    (d) heating the light absorptive layer to its softening temperature whereby a uniform frost pattern is formed therein; and (e) selectively exposing regions of the light absorptive layer to a modulated beam of light of said wavelength whereby the energy absorbed by the light absorptive layer from said beam heats the light absorptive layer to its softening temperature thereby erasing the frost pattern in the regions so exposed to said beam.

11. A method according to claim 8 or 10 wherein the organic material is selected from the group consisting of metal complexes of substituted ethylene dithiols having the structure

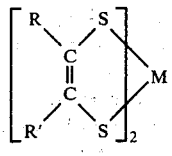

where M is Pt, Pd, or Ni and R and R' are independently alkyl, phenyl or substituted phenyl groups.

* * * * *